United States Patent [19]

Woodhouse

[11] Patent Number: 5,490,645
[45] Date of Patent: Feb. 13, 1996

[54] FULLY INTEGRATED ENVIRONMENTAL AND SECONDARY POWER SYSTEM

[75] Inventor: Geoffrey D. Woodhouse, Prescott, Ariz.

[73] Assignee: Allied-Signal Inc., Morris Township, Morris County, N.J.

[21] Appl. No.: 164,491

[22] Filed: Dec. 9, 1993

[51] Int. Cl.6 .................................................. B64D 13/06
[52] U.S. Cl. .................. 244/118.5; 244/58; 60/39.33; 62/134; 454/71; 454/76
[58] Field of Search .......................... 244/118.1, 118.5, 244/58, 53 R; 60/39.07, 39.142, 39.33; 454/71, 76, 70, 72, 73, 74, 75; 417/411, 427; 290/2, 52; 62/134, DIG. 5, 241, 243

[56] References Cited

U.S. PATENT DOCUMENTS

| | | |
|---|---|---|
| 2,618,470 | 11/1952 | Brown et al. . |
| 2,734,443 | 2/1956 | Wood . |
| 2,777,301 | 1/1957 | Kuhn . |
| 3,177,679 | 4/1965 | Quick et al. . |
| 3,326,109 | 6/1967 | Markham . |
| 4,091,613 | 5/1978 | Young . |
| 4,261,416 | 4/1981 | Hamamoto . |
| 4,494,372 | 1/1985 | Cronin . |
| 4,503,666 | 3/1985 | Christoff . |
| 4,684,081 | 8/1987 | Cronin . |
| 4,706,908 | 11/1987 | Hoffman et al. ................... 244/58 |
| 5,143,329 | 9/1992 | Coffinberry . |
| 5,145,124 | 9/1992 | Brunskill et al. . |
| 5,151,022 | 9/1992 | Emerson et al. . |
| 5,309,029 | 5/1994 | Gregory et al. ................... 244/58 |

FOREIGN PATENT DOCUMENTS

| | | |
|---|---|---|
| 0459816A1 | 12/1991 | European Pat. Off. . |
| 89880 | 1/1959 | Netherlands . |
| 1186375 | 4/1970 | United Kingdom . |
| 2076897 | 6/1980 | United Kingdom . |

OTHER PUBLICATIONS

WO91/04395, Klaass et al., PCT Publ. Applic., Apr. 4, 1991.
SAE Technical Paper Series (891436) "High Temperature Bootstrap Compared with F–15 Growth Air Cycle Air Conditioning System" by D. Matulich.
SAE Technical Paper Series (932055) "Integrated Aircraft Thermal Management and Power Generation" by J. M. Gambill/D. E. Wiese/H. M. Claeys/D. S. Matulich/C. F. Weiss.
SAE Technical Paper Series (931382) "A Subsystem Integration Technology Concept" by H. Carter III/Dan S. Matulich/Carl F. Weiss.

*Primary Examiner*—Galen L. Barefoot
*Attorney, Agent, or Firm*—Jerry J. Holden; James W. McFarland

[57] ABSTRACT

An aircraft subsystem provides the aircraft with all its electrical and conditioned air requirements without requiring the extraction of either shaft power and/or pressurized air from the aircraft's main engines. At the core of this subsystem are two rotating assemblies journaled on non-oil lubricated bearings to a housing. One assembly includes a cooling turbine, a starter/generator, a core compressor, and a high pressure stage of a two stage axial turbine, all mounted on a single shaft. A combustor is disposed between the core compressor and the turbine. The other assembly is comprised of the low pressure stage of the axial turbine coupled to a load compressor via a second shaft. The high pressure turbine stage and cooling turbine are sized to drive the core compressor and starter/generator which provides all the aircraft's electrical needs both on the ground and inflight. The low pressure turbine stage drives the load compressor, which produces pressurized air that is conditioned through heat exchange components and then expanded and cooled across the cooling turbine before being delivered to the aircraft cabin.

3 Claims, 2 Drawing Sheets

FULLY INTEGRATED ENVIRONMENTAL AND SECONDARY POWER SYSTEM

TECHNICAL FIELD

This invention relates generally to aircraft subsystems, and in particular to an aircraft subsystem that provides electricity and conditioned air to the aircraft independently of the main propulsion engines, thereby increasing the fuel efficiency of the engines.

BACKGROUND OF THE INVENTION

In addition to propulsion, aircraft main engines also provide shaft power through a gearbox to drive electric generators, hydraulic pumps, and fuel pumps. They also provide pressurized air for the environmental control system, which uses this air to cool or heat, ventilate, and pressurize the aircraft cabin. The extraction of pressurized air and shaft power from the main engines is referred to as parasitic loss, and must be compensated for by increasing the fuel flow to the main engines. It has long been a goal of aircraft and aircraft engine designers to minimize or eliminate these parasitic losses, and thereby improve the fuel efficiency of the main engines. In particular, it has been recognized that the electrical generators and environmental control systems are the two largest sources of parasitic losses.

When the aircraft is on the ground and the main engines are shutdown, many types of aircraft employ an auxiliary gas turbine engine to supply pressurized air for environmental control systems or main engine starting, and shaft horsepower to drive accessories such as an electric generator. Recent technological advances now enable these engines to be started and operated inflight in an emergency such as a main engine shutdown, however, under normal inflight operating conditions the burden of providing electricity and pressurized air still falls on the main engines.

Cronin, U.S. Pat. No. 4,494,372 discloses a multi-role primary/auxiliary power system for an aircraft that provides electrical, mechanical, and air conditioning power as well as main engine starting functions. Although this system eliminates the parasitic loss due the extraction of air from the main engine, it still needs mechanical power from the main engine to provide electrical power to the aircraft. Similarly, Cronin, U.S. Pat. No. 4,684,081 discloses a multifunction power system that combines an auxiliary power unit, environmental control system, engine start system, and emergency power system for an aircraft. This system also does not require pressurized air from the engine, however, in the flight cooling mode electrical power is extracted from the main engines to power the system.

Christoff, U.S. Pat. No. 4,503,666 discloses an integrated auxiliary power and environmental control unit having a power turbine and a cooling turbine mechanically coupled to a single compressor. However, inflight pressurized air from the main engines is still needed to operate the environmental control unit.

Accordingly, there is still a need for a an aircraft subsystem that eliminates parasitic losses by providing both electricity and conditioned air to the aircraft independently of the main engines.

SUMMARY OF THE INVENTION

An object of the present invention is to provide an aircraft subsystem that eliminates main engine parasitic losses by providing both electricity and conditioned air for aircraft pressurization, thus increasing the fuel efficiency of the main propulsion engines.

Another object of the present invention is to increase the reliability of the main engines by eliminating the gearbox needed to drive accessories.

Still another object of the present invention is to provide an aircraft subsystem that employs non-oil lubricated bearings.

Yet still another object of the present invention is to reduce the cost and weight of aircraft subsystems.

The present invention achieves the above-stated objectives by providing a novel integration of turbomachinery and heat transfer components into a single aircraft subsystem. At the core of this subsystem are two rotating assemblies journalled on non-oil lubricated bearings to a housing. One assembly includes a cooling turbine, a starter/generator, a core compressor, and a high pressure stage of a two stage axial turbine, all mounted on a single shaft. A combustor is disposed between the core compressor and the turbine. The other assembly is comprised of a low pressure stage of the axial turbine coupled to a load compressor via a second shaft. The high pressure turbine stage and cooling turbine are sized to drive the core compressor and starter/generator which provides all the aircraft's electrical needs both on the ground and inflight. The low pressure turbine stage drives the load compressor, which produces pressurized air that is conditioned through heat exchange components and then expanded and cooled across the cooling turbine before being delivered to the aircraft cabin. The load compressor also supplies the required air for main engine starting.

Thus, the subsystem eliminates main engine parasitic losses by supplying the aircraft with all its electrical and conditioned air requirements.

These and other objects, features and advantages of the present invention, are specifically set forth in, or will become apparent from, the following detailed description of a preferred embodiment of the invention when read in conjunction with the accompanying drawings.

DESCRIPTION OF THE PREFERRED EMBODIMENT

Figure 1:
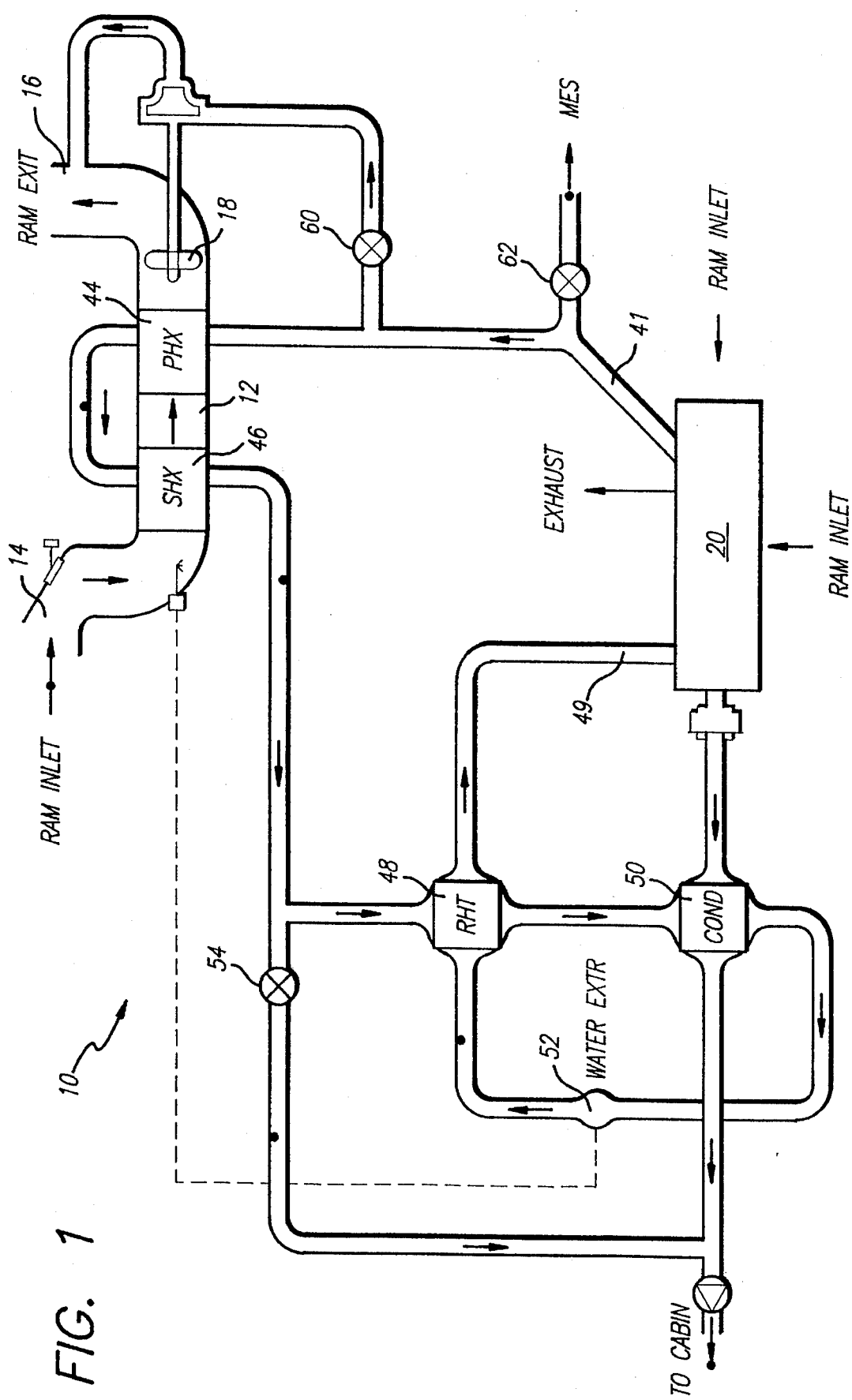
FIG. 1 is a schematic representation of an aircraft subsystem contemplated by the present invention.

FIG. 1 shows an aircraft subsystem 10 that can be mounted within a compartment in an aircraft. The aircraft compartment includes a ram air duct 12 extending therethrough. The inlet 14 and exit 16 of the duct 12 are open to the atmosphere thus permitting a flow of air through the duct 12 when the aircraft is in motion. An air turbine driven fan 18 disposed in the duct 12 generates air flow through the duct 12 when the aircraft is not moving.

Figure 2:
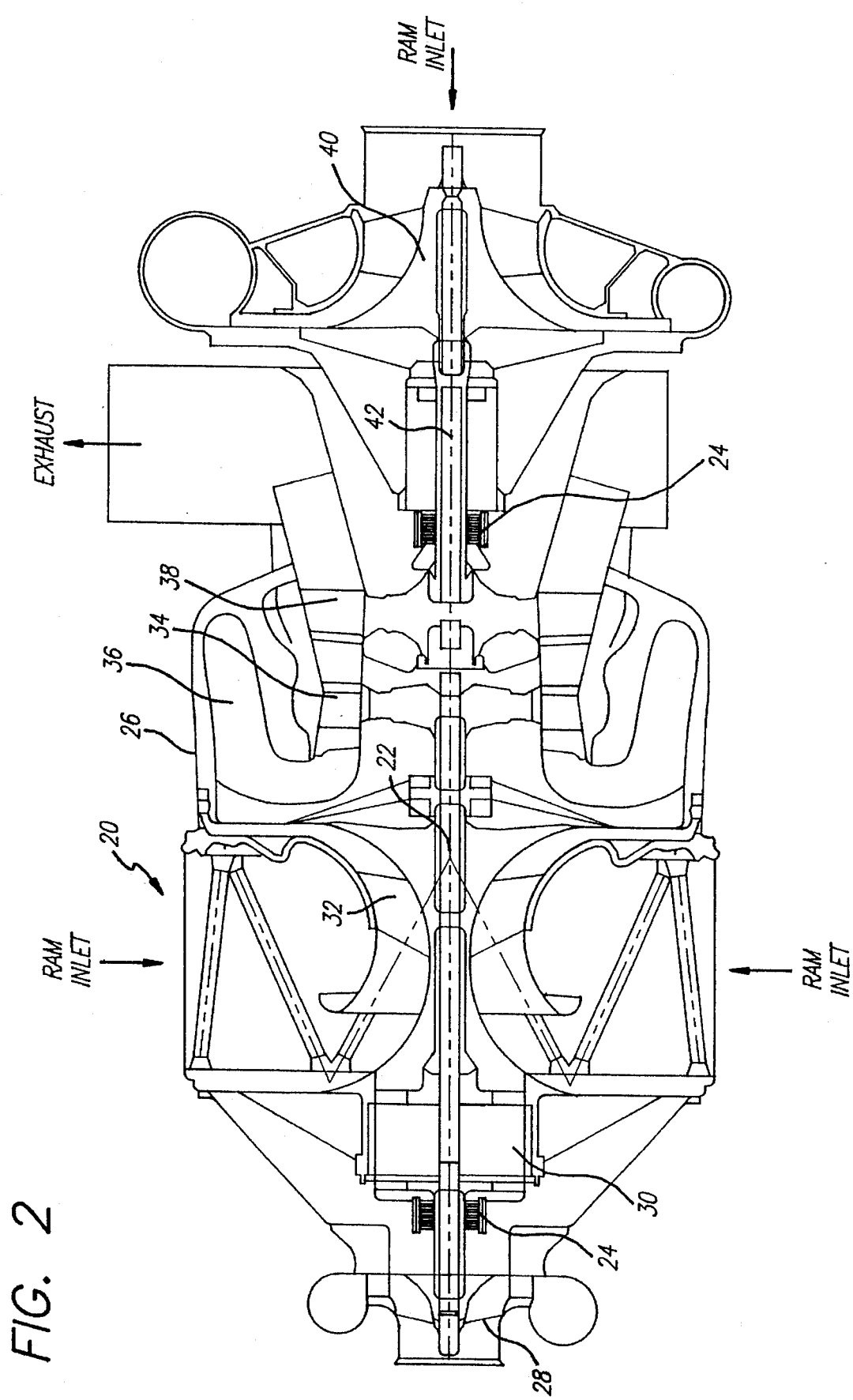
FIG. 2 is a cross-sectional view of the power producing portion of the aircraft subsystem of FIG. 1.

The subsystem 10 has a power section 20 comprised of a plurality of turbomachinery components. Referring to FIG. 2, the power section 20 includes a first shaft 22 and a second shaft 42. Both shafts 22, 42 are journaled on a non-oil lubricated bearing 24, such as an air bearing or magnetic bearing, to a housing 26. Mounted on the shaft 22 are a cooling turbine 28, a starter/generator 30, a core compressor 32, and a high pressure stage 34 of a two stage axial turbine.

A combustor 36 is disposed between the core compressor 32 and the high pressure stage 34. The low pressure stage 38 of the two stage axial turbine and a load compressor 40 are mounted on the second shaft 42. An fuel pump, (not shown), is driven by the starter/generator 30 and pumps metered fuel from storage tanks aboard the aircraft to the combustor 36. An electrically driven hydraulic pump may be added to the system if the aircraft requires hydraulic power.

In operation, ram air is ingested by the core compressor 32 and compressed. This compressed air mixes with fuel in the combustor 36 and the mixture is ignited to form a hot gas. The hot gas expands across the high and low pressure stages 34,38. The high pressure stage 34 and the cooling turbine 28 drive the first shaft 22 which drives the starter/generator 30 which generates electricity. The low pressure stage 38 drives the second shaft 42. From the low pressure stage 38 the hot gas exhausts overboard. Because the high pressure stage 38 and the low pressure stage 38 are mounted on different shafts, they can be operated at different rotational speeds.

The load compressor 40 also ingests ram air and compresses the air raising its temperature and pressure. Referring back to FIG. 1, from the load compressor 40 the air flows through a conduit 41 to a primary air-to-air heat exchanger 44 and then to a secondary air-to-air heat exchanger 46 where it is cooled to near ambient temperature with very little pressure drop. Both heat exchangers 44,46 use the air in the duct 12 as a heat sink. For operation on the ground a control valve 60 is opened to allow, a portion of the air from the load compressor 40 to drive the fan 18. Also, air from the load compressor 40 can be used for main engine starting, (MES), by opening valve 62.

From the secondary heat exchanger 46, the air flows through a reheater 48 where it is used as a heat sink and then to a condenser 50 where it is cooled while undergoing only a slight pressure drop. This results in condensation of almost all the moisture that may have been in the air stream. The condensed moisture is mechanically removed from the air stream by a water extractor 52 which centrifuges the water droplets out of the air and then drains the water into the duct 12 upstream of the secondary heat exchanger 46.

The cooled, dried air exiting the water extractor 52, passes back through the reheater 48 where it is heated, and then through a conduit 49 to the cooling turbine 28. In the cooling turbine 28 the air is expanded to near atmospheric pressure and cooled to well below ambient temperature. The cooling turbine also generates shaft power for driving the first shaft 22. This cold air then circulates through the condenser 50 where it is used as a heat sink. The air then passes to a cabin of an aircraft. The temperature of the air entering the cabin is controlled by mixing it with warmer air from between the secondary heat exchanger 46 and the reheater 48. The flow of this warmer air is controlled by a valve 54.

Thus, the subsystem 10 can continuously provide both electricity and conditioned air to the aircraft without extracting shaft power or pressurized air from the main engines.

What is claimed is:

1. An aircraft subsystem comprising:

a first and second shaft journalled for rotation to a housing;

a first compressor mounted to said first shaft;

a first turbine mounted to said first shaft;

a combustor disposed between said first compressor and said first turbine and in fluid communication therewith;

a starter/generator mounted to said first shaft for providing electricity to said aircraft;

a second compressor mounted to said second shaft and providing a flow of pressurized air;

a second turbine mounted to said second shaft and in fluid communication with said first turbine; and a third turbine mounted to said first shaft and in fluid communication with said second compressor for cooling said flow of pressurized air and providing said cooled air to said aircraft.

2. The subsystem of claim 1 further comprising a heat exchanger disposed between said second compressor and said third turbine, said heat exchanger being mounted in a ram duct on said aircraft.

3. The subsystem of claim 2 further comprising means for drying and cooling air in fluid communication with said heat exchanger and said third turbine.

* * * * *